US008489321B2

(12) United States Patent
Lee

(10) Patent No.: US 8,489,321 B2
(45) Date of Patent: Jul. 16, 2013

(54) NATURE EVENT SIGNALING

(75) Inventor: Choy Wai Lee, Olathe, KS (US)

(73) Assignee: Garmin Switzerland GmbH (CH)

( * ) Notice: Subject to any disclaimer, the term of this patent is extended or adjusted under 35 U.S.C. 154(b) by 163 days.

(21) Appl. No.: 13/150,286

(22) Filed: Jun. 1, 2011

(65) Prior Publication Data

US 2012/0310530 A1 Dec. 6, 2012

(51) Int. Cl.
*G01C 21/00* (2006.01)

(52) U.S. Cl.
USPC ............................ 701/400; 701/415; 701/302

(58) Field of Classification Search
USPC .................................. 701/201, 400, 302, 415
See application file for complete search history.

(56) References Cited

U.S. PATENT DOCUMENTS

| 5,790,974 | A | 8/1998 | Tognazzini | 701/204 |
| 6,871,144 | B1 | 3/2005 | Lee | 701/213 |
| 7,423,936 | B2 * | 9/2008 | Lizzi | 368/77 |
| 7,739,040 | B2 | 6/2010 | Horvitz | 701/210 |
| 7,822,546 | B2 | 10/2010 | Lee | 701/209 |
| 7,852,710 | B2 * | 12/2010 | Kelly et al. | 368/16 |
| 2008/0062819 | A1 * | 3/2008 | Kelly et al. | 368/11 |
| 2009/0005080 | A1 * | 1/2009 | Forstall et al. | 455/456.3 |
| 2010/0094496 | A1 * | 4/2010 | Hershkovitz et al. | 701/22 |

OTHER PUBLICATIONS

GARMIN GPS 60, Mar. 2006, pp. 28, 50, 53, and 66 referring to sunset, sunrise, and moon phase.*
Garmin's nüLink™ 1695 Owner's Manual, including, but not limited to pp. 17 and 18; 2010.
Garmin's Astro® Owner's Manual, including, but not limited to pp. 52 and 55; Apr. 2007.
Printout from https://buy.garmin.com/support/searchSupport/case.faces?caseId={079c9120-cfd1-11df-e7d8-000000000000}, Oct. 4, 2010.

* cited by examiner

*Primary Examiner* — Mary Cheung
*Assistant Examiner* — Michael Berns
(74) *Attorney, Agent, or Firm* — Samuel M. Korte; Mohammad M. Ali

(57) ABSTRACT

Methods and apparatus for nature event signaling are provided. Example mobile electronic devices of the present disclosure can include a non-transitory computer-readable medium having computer-readable instructions stored thereon, and a processor coupled to the non-transitory computer-readable medium. The processor executes the instructions to calculate a distance between a reference location and a current location, and calculate a travel time for the distance based on a speed. The processor also executes the instructions to determine a nature event time and cause a return alert indication to be signaled, via the mobile electronic device, based on a comparison of a calculated travel time and the nature event time.

18 Claims, 5 Drawing Sheets

NATURE EVENT SIGNALING

BACKGROUND

Because of their relatively small size and form, mobile electronic devices such as personal navigation devices (PNDs), smart phones, mobile phones, personal digital assistants (PDAs), watches, and so forth, offer several practical advantages with respect to providing maps and map-related content to a user. For example, because of their portability, mobile electronic devices are capable of providing real time navigational information to a user in a convenient fashion, such as while the user is traveling.

Some navigation activities may be undertaken with respect to certain events of nature, such as sunrise and sunset. Events of nature can depend on local conditions such as latitude, elevation, and/or topology, which can affect a local time of occurrence. Outside physical activities, such as walking, running, hiking, biking, and other modes of transportation may preferably be performed under favorable visibility conditions, such as with sufficient daylight. Some activities, such as driving, flying, and/or marine travel, may be subject to various rules and/or laws that reference a position of the sun, such as by referring to periods of day or night. For example, some vision-impaired drivers may be restricted to only operating a vehicle during daylight hours, a plane or boat may not be equipped with the required lighting for night operations, or changing tides may make traveling a particular nautical route unwise.

DETAILED DESCRIPTION

Methods and apparatus for nature event signaling are provided. Example mobile electronic devices of the present disclosure can include a non-transitory computer-readable medium having computer-readable instructions stored thereon, and a processor coupled to the non-transitory computer-readable medium. The processor executes the instructions to calculate a distance between a reference location and a current location, and calculate a travel time for the distance based on a speed. The processor also executes the instructions to determine a nature event time, and cause a return alert indication to be signaled, via the mobile electronic device, based on a comparison of the calculated travel time and the nature event time.

In some embodiments, the processor may execute the instruction to calculate an arrival time at the reference location as a sum of a current time at the reference location and the travel time and cause a return alert indication to be signaled based on a comparison of a calculated arrival time at the reference location, travel time, and nature event time.

As used herein, a location generally refers to a position located in three-dimensional coordinate system. However, location can interchangeably refer to a point on a surface located in two-dimensional coordinate system, with or without consideration of the third dimension of elevation and/or altitude. Elevation and/or altitude can affect the location of the horizon, and the time of occurrence of certain nature events defined with respect to the horizon.

Figure 1:
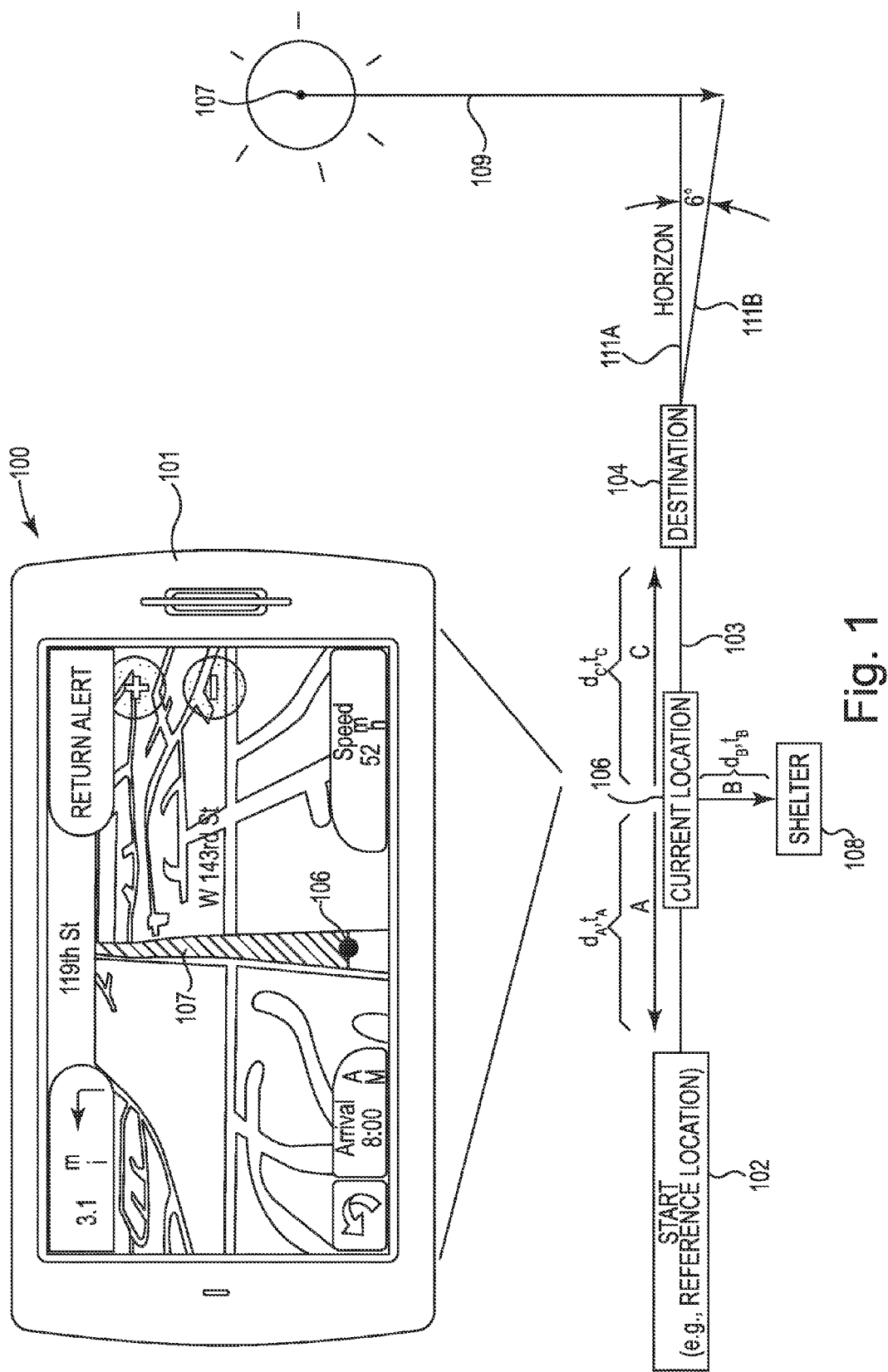
FIG. 1 illustrates a navigation example involving nature event signaling according to various embodiments of the present disclosure.

FIG. 1 illustrates a navigation example involving nature event signaling according to various embodiments of the present disclosure. According to one or more embodiments of the present disclosure, a mobile electronic device 100 operates to provide navigation information to a user. The mobile electronic device 100 can be used as a portable navigation device for use on land, water, or in the air, with respect to a well-defined course or an undefined course. The mobile electronic device 100 can operate as a navigational aid providing a user a graphical indication of a route 103 towards a desired destination 104 from a current location 106. The mobile electronic device 100, in addition, or as an alternative, to providing navigational information, is configured to determine a current location, store a reference location, provide navigation directions, calculate and signal a return alert for the user to proceed from the current location to a reference location. The return alert can enable a user to begin travel from the current location in order to reach a reference location before the occurrence of the nature event.

A user, and/or the mobile electronic device 100 itself, may select a reference location, such as a location from which a route began, a waypoint, or point of interest (POI). Enroute, the mobile electronic device can periodically or continuously track distance from a current location to the selected reference location(s). The distance can be determined over known routes traveled or by a most direct navigable route. Travel time for a user to travel from the current location to a reference can be determined using calculations to estimate the time it may take a user to travel the distance based on speed or historical data of time taken for a user to travel the distance in the past.

For example, the starting location may be identified as a reference location and a nature event of interest may be sunset. If, at 6:00 pm, the user has traveled one mile from the reference location, the mobile electronic device 100 may calculate a travel time of ten minutes and a nature event time that of 6:15 pm (i.e., fifteen minutes from the current time), the mobile electronic device 100 may compare the travel time of ten minutes and time until nature event of fifteen minutes to cause a return alert indication to be signaled notifying the user that it is desirable for him to return to the reference location.

In some implementations, the return alert may be signaled a time that will give the user more than the required time to travel to a reference location, only the minimal time to travel to a reference location, and/or insufficient time to travel to a reference location. For instance, in the above example, the mobile electronic device 100 may signal a return alert five minutes early to give the user more than the required time to travel to a reference location (i.e., signal a return alert at 6:00 pm). Alternatively, the mobile electronic device 100 may signal a return alert at a time that will give the user only the minimal required time to travel to a reference location (i.e., signal a return alert at 6:05 pm). Also, the mobile electronic device 100 may signal a return alert late to give the user notice of warning of the nature event with insufficient time to travel to a reference location (i.e., signal a return alert at 6:10 pm).

In some implementations, the mobile electronic device 100 may signal a return alert during all three periods.

The diagram shown in FIG. 1 includes a starting location (e.g., a reference location) 102, a destination location 104, a current location 106, and a shelter location 108. The destination location 104 is not necessarily intended to be a terminus of intended travel, and can represent a endpoint of a desired route.

Arrow A shown in FIG. 1 represents a direction and distance, $d_A$, from the current location 106 back to the starting location 102, which may also be designated as a reference location. The estimated time to travel the distance $d_A$ is indicated as time $t_A$. Arrow B represents a direction and distance, $d_B$, from the current location 106 to the shelter location 108. The estimated time to travel distance $d_B$ is indicated as time $t_B$. Arrow C represents a direction and distance, $d_C$, from the current location 106 to the destination location 104. The estimated time to travel the distance $d_C$ is indicated as time $t_C$.

A user may plan a hike beginning from a base camp starting location 102 towards the destination 104, with intentions to return to the base camp before sunset. The user may set the base camp starting location 102 as a reference location and associate a nature event time with the estimated time for sunset for a nature event signaling function of the mobile electronic device 100. The user's current location can be determined and tracked by the mobile electronic device 100 as the hike progresses. Mobile electronic device 100 may calculate the estimated travel time for a user to travel from the current location 106 to a reference location, which may be the base camp starting location 102, and a shelter location 108. The mobile electronic device 100 can signal the user to begin to return to a reference location (e.g., the base camp starting location 102) when the time to travel from the current location back to the reference location is equal to the time left until the nature event time of sunset. If the user leaves base camp starting location 102 too late in the day, or travels too slowly, the user may be signaled to begin to return to the base camp starting location 102, which may have been set as a reference location, even before the user can reach the intended destination 104 of the hike.

With respect to a return alert function, a reference location is a particular location to which the user wishes to arrive before the occurrence of a nature event. For example, the reference location for a camper may be a location previously visited, some future destination location such as a next intended camp site, a shelter location, and/or some other location. The nature event may be sunset, such that the return alert function can alert the camper to begin towards a reference location (e.g., camp) from their current location so as to arrive before the nature event time of sunset.

Although referred to herein as a "return" alert, embodiments of the present disclosure are not limited to the reference location being a previous location. That is, the reference location can be any location including an intended destination or an alternative shelter. For example with respect to the diagram shown in FIG. 1, the return alert function can signal a hiker at current location 106 to proceed back to the start location so as to arrive at the start location 102 before sunset, proceed to the destination location 104 so as to arrive at the destination location 104 before sunset, and/or proceed to the shelter location 108 so as to arrive at the shelter location 108 before sunset. As such, terms used herein such as "return" speed, "return" distance, and/or "return" travel time refer to quantities associated with the "return" alert, are not limited to quantities associated with travel to a previous location, and can refer to quantities associated with travel to any future location (e.g., a shelter location 108).

A return alert may be based on more than one reference location. The quantity of reference locations is not intentionally limited. When more than one reference location is selected, a return alert may be provided for each reference location as the associated return alert condition occurs, for only the closest reference location, for only the furthest reference location, or by some other prioritization scheme. As terrain, weather, and/or other factors impacting travel may be different for each of a plurality of reference locations, different speeds, corresponding to each of the respective routes from the current location to a respective one of the plurality of reference locations may be used in time calculations. A return alert based on a plurality of reference locations can be indicated according to a distance, departure time, and/or arrival time hierarchy. User input can set and/or change the hierarchy.

The mobile electronic device can calculate a travel time from a distance and a speed. Travel time equals distance divided by speed. As used herein, speed is the magnitude portion of a return velocity. Velocity also includes a direction component. The return speed can be a speed input by the user, an average speed calculated enroute from the reference location to the current location, a present speed, a speed associated with the return route stored in a historical database, or may be derived from return route terrain, elevation change, distance, and/or other conditions.

According to various embodiments, the mobile electronic device can prompt a user to return to the reference location based on a calculated arrival time at the reference location calculated from a sum of the current time and an expected travel time to the reference location. The calculated arrival time can be compared to the time a particular nature event occurs at the reference location. Alternatively, the electronic device can prompt a user to return to the reference location based on a calculated departure time calculated as a difference between a nature event time and the expected travel time to the reference location, where the calculated departure time is compared to a current time. Alternatively, the electronic device can prompt a user to return to the reference location based on a remaining time calculated as a difference between a nature event time and a current time. The remaining time can be compared to the expected travel time.

The nature event signaling techniques of the present disclosure can be implemented in a mobile electronic device with global positioning system (GPS) capabilities and having mark-and-go capabilities to indicate a reference location. For example, a user can mark their camp as the reference location and then go explore the woods. The mobile electronic device can provide navigation information to the hiker and track in the background the distance away from the camp so as to continuously or periodically estimate the time required to get back to camp. The mobile electronic device can determine the current time and compute, for example, the sunset time at the camp for the present day using on-board, nature event information such a as geo-referenced database of sunset times, or by retrieving some or all such information from an applicable remote database. When the current time plus the calculated return travel time is no longer less than the sunset time at the camp, the mobile electronic device can signal a return alert based on sunset to remind the user to begin to return to camp if they want to get back before dark.

The mobile electronic device may be used on a well-defined course or an undefined course, for land-based activities, air-based activities, water-based activities. Such return alert capability incorporated into a mobile electronic device may be useful for outdoor activities, such as camping, hiking, hunting, and/or fitness activities such as walking and running.

Hunters may desire to signal a nature event based on sunrise in navigating to a hunting location prior to a sunrise start to hunting activities. Military activities, such as troop movements during the cover of darkness and/or before dark, can benefit from return alerts corresponding to sunrise and/or sunset. Return alert capability may also be useful in aviation and in boating or sailing activities.

A user graphic such as a dot, an arrow, an automobile icon, human or non-human figure, or the like, can be displayed to indicate the current location 106 of the user (i.e., of the mobile electronic device 100). According to some embodiments, the map can employ a three dimensional (3D) display orientation, a track up orientation, or north-up orientation may also be provided.

The mobile electronic device 100 may broadly comprises a satellite navigation component, such as a GPS component, configured to provide geographic location information for the mobile electronic device 100 based on signals received from two or more members of an array of orbiting satellites. This location information can be provided to the processor, along with other data, for further processing thereof. The GPS component may be, for example, a GPS receiver much like those provided in products by Garmin®. In the various embodiments, a calculated route can be indicated on a cartographic presentation (e.g., map). In the various embodiments, a track log can record and display past device locations (e.g., route of travel). In this manner a user can easily retrace a route they have taken.

Return alert functionality can be determined in the background to the functionality of the mobile electronic device 100 as a navigational aid, and alert the user as necessary, such as according to default and/or input settings related to the return alert functionality. Other features and attributes of the mobile electronic device 100 are described later with respect to FIG. 4.

A nature event is a naturally occurring event, such as astronomical events involving certain positions of the sun (e.g., sunset, sunrise), stars, planets, and the moon, tide levels, flooding, severe weather (e.g., from NOAA broadcasts and/or alerts), and the like. Mobile electronic device 100 may identify the occurrence of a nature event at a user's current location, a reference location, shelter location, or other location.

The diagram shown in FIG. 1 depicts a sun position with respect to the horizon 111A as an example of a nature event of interest at the reference location because the position of the sun relative to the horizon 111A affects the amount of light available for navigation. The diagram in FIG. 1 shows the sun being some distance 109 above an angle 111B measured relative to the horizon 111A. The angle 111B measured relative to the horizon 111A can be zero degrees (e.g., the horizon 111A itself), or some other angle measured with respect to the horizon 111A. For example, as shown in the diagram of FIG. 1, the angle 111B can be 6 degrees below the horizon 111A, which is used in determining periods of twilight.

Due to the magnitude of the sun, references to the position of the sun may intend the position of the center of the sun 107. However, references to the position of the sun can also be based on the position of an edge of the sun. For example, sunset is generally understood by casual observers to mean when the upper edge of the sun disappears below the horizon 111A such that no part of the sun is visible above the horizon 111A, and sunrise is generally understood to mean when the upper edge of the sun is just visible above the horizon 111A.

Navigation can be aided by daylight when navigation features are visible, and navigation can be hindered by darkness. Atmospheric conditions, such as weather, are assumed to be average (e.g., partly clear sky). If the horizon in the direction of sunrise or sunset is at a higher altitude than that of the observer, the sunrise will be later and sunset earlier. If the horizon is at a lower altitude than that of the observer, the sunrise will be earlier and sunset later.

However, a nature event does not occur instantaneously. Instead, a nature event may occur in a window of time. In some embodiments, a reasonable tolerance may be incorporated into the time of occurrence of the nature event to account for error in the estimated time of occurrence of a nature event. A reasonable tolerance may widen the window of the time of occurrence of a nature event by an amount of time that is set by default, configured by a user, or based on scientific information. For instance, mobile electronic device 100 may adjust all nature event times by ten minutes to account for error. If the calculated time of occurrence of a nature event is 5:00 pm, mobile electronic device 100 may adjust the nature event time by ten minutes to 4:50 pm and/or 5:10 pm based on a default setting, user configuration, or scientific information.

The boundary between daylight and darkness is not instantaneous. Instead, the change between daylight to darkness is gradual. In order to add some precision to the transition from daylight to darkness, certain sun positions have been defined by convention, rule, or law, such as the beginning or end of various periods of twilight. Before sunrise and again after sunset there are periods of twilight during which there is natural light provided by the upper atmosphere, which still receives direct sunlight and reflects part of it toward the Earth's surface. According to the U.S. Naval Observatory, civil twilight is the period when the sun is below the horizon 111A but its center 107 is at an angle 111B less than 6 degrees below, and nautical twilight is the period of time when the center of the sun 107 is between 6 and 12 degrees below the horizon. While sunrise and sunset are taken as the time when the top edge of the sun is at the horizon 111A, civil dawn and civil dusk occur when the center of the sun 107 is 6 degrees below the horizon 111A. A user may set twilight as a nature event for return alerts. Federal Aviation Regulations (FARs) include several provisions that are referenced to sunrise and sunset, including aircraft lighting requirements and pilot night flying proficiency requirements.

Other nature events may also be relevant to navigation, such as tide levels. For example, a waterway may be navigable during high tide, but not navigable during low tide. A mobile electronic device with nature event signaling used in a nautical environment can signal a boater to return to dock before water levels are unfavorable due to low tide, or can be used to plan passage through a particular waterway during navigable high tides. Determining a nature event time can include accessing a remote database having nature event time tables, such as for sunrise/sunset tides, moon phase, etc.

Figure 2:
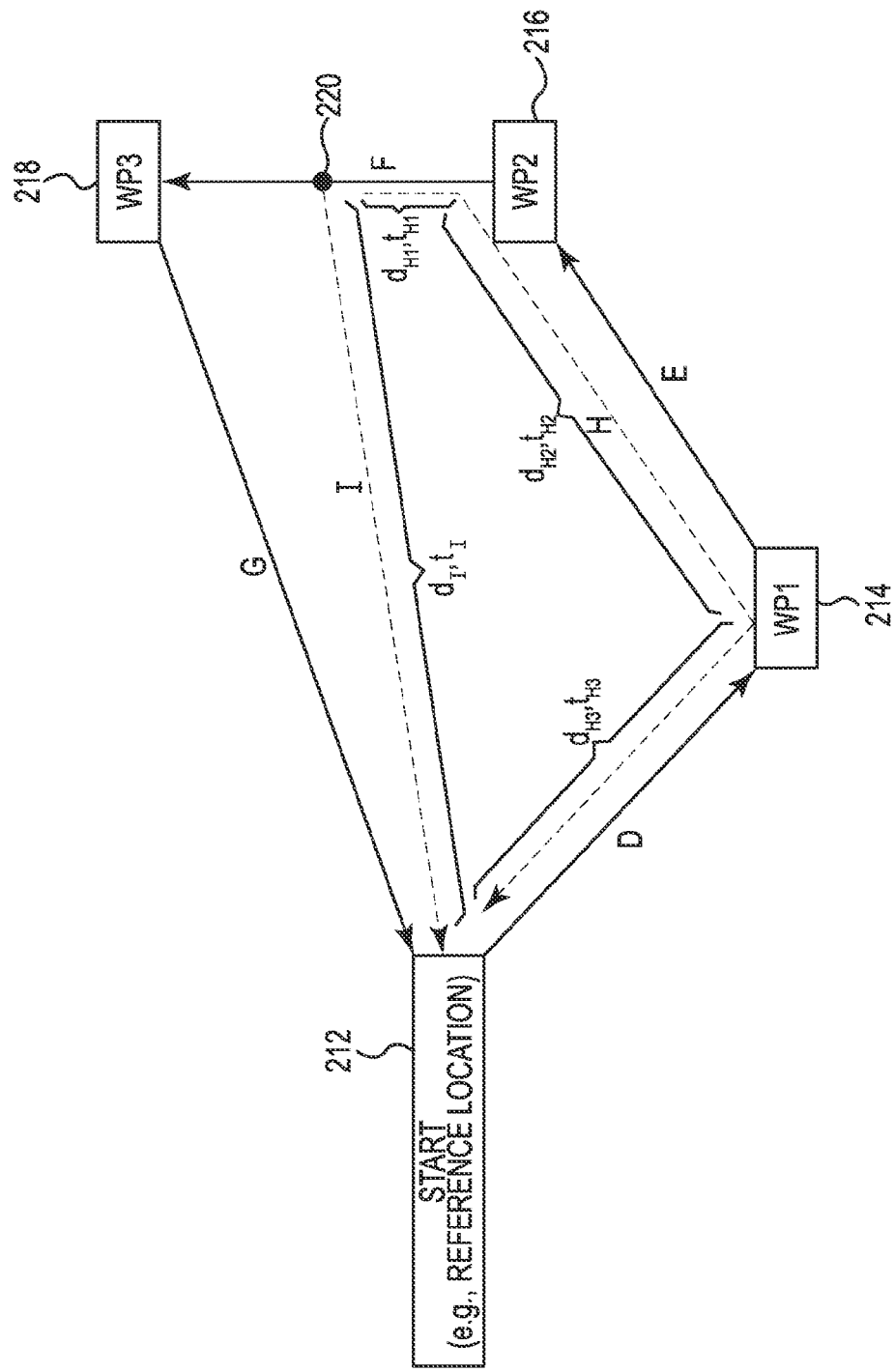
FIG. 2 illustrates a navigation example involving direct and indirect return routes corresponding to a return alert according to various embodiments of the present disclosure.

FIG. 2 illustrates a navigation example involving direct and indirect return routes corresponding to a return alert according to various embodiments of the present disclosure. A return distance can be calculated along an indirect route as indicated in FIG. 2 by arrow H such as a backtrack of the outbound route (e.g., arrows D, E, and portion of F shown in FIG. 2) taken to reach a current location 220, can be a direct route from a current location 220 to the reference location (e.g., "as the crow flies") as indicated in FIG. 2 by arrow I, or can be determined by a shortest determined navigable return route (e.g., a shortest route using all available routes).

FIG. 2 shows a starting location 212 (e.g., reference location), a first waypoint 214, a second waypoint 216, and a third waypoint 218, collectively representing an intended route via arrows D, E, and F that returns back to the starting location 212 via arrow G. A current location is indicated in FIG. 2 at 220. The reference location is selected to be the starting location 212. Arrow I indicates a direct return route from the current location 220 to the starting location 212 having a return distance $d_1$ and an estimated return time $t_I$ to travel distance $d_I$. Arrows $H_1$, $H_2$, and $H_3$ indicate an indirect return route that backtracks the outbound route and has a distance $t_{H1}+t_{H2}+t_{H3}$ from the current location 220 to the starting location 212. The estimated time to travel distance H is equal to the sum of times $t_{H1}+t_{H2}+t_{H3}$.

According to one or more embodiments of the present disclosure, unless otherwise set by a user, a return alert may be based upon a return distance being along the reverse of the route traveled from the reference location to the current location, or the return alert may be based upon a return distance being along the direct return route from the current location to the reference location, or the return alert may be based upon a return route determined along a navigable route etc., or by some other determined return route. A user may select a desired return route methodology (e.g., reverse route, direct route, determined navigable route) upon which the one or more return alert functions is operable.

According to one or more embodiments, the speed used in calculating an estimated time to travel the return distance may be derived from the recent travel of the user. For example, estimated time to travel the return distance may be the travel time from the reference location to reach the current location where the return distance is the reverse route. That is, the return speed can be the average speed of the outbound travel. Alternatively, the return speed can be a user input. For example, a user may progress at a leisurely pace during outbound travel, exploring the woods or occasionally stopping to see the sights and/or relax. However, a user may desire to have the return alert based upon an input speed different than that of the outbound travel when the user is proceeding back to the reference location with an intention to arrive before dark.

As will be understood, the direct return route from the current location to the reference location may not be a navigable route, or may have unexpected terrain, or other factors that hinder travel or otherwise make the achievable return speed unknown. According to some embodiments, the return speed can be the average travel speed for outbound travel, a user-input speed, or may be a speed derived by the mobile electronic device based on speed for routes recorded having similar terrain and elevation changes.

According to various embodiments, a return speed may be adjusted by certain factors, such as different elevation changes and/or weather (e.g., different wind direction and speed), from the speed associated with outbound travel or input by the user. Nature event times can also be adjusted based on elevation of the reference location, and/or compensated according to topology (e.g., mountains) which may impact timing of the nature event (e.g., sunset). For example, if the outbound travel occurred over a decreasing elevation from the reference location to the current location, speed for the return distance that is reverse of the outbound travel may be decreased to reflect that the return route will include increasing elevation and thus may be traversed at a lesser speed. Likewise, if wind direction is known, for example from weather information 443 communicated by a broadcasting service 441 such as NOAA, return speed may be adjusted to reflect a change in return speed due to changed wind effects between the outbound route and the return route. A return speed input may be specified for level terrain and zero wind conditions, and adjusted in the computation of a return alert based on elevation and wind changes. This functionality may be particularly relevant to use of the mobile electronic device in aviation and/or marine environments.

Return alerts may also be adjusted according to other mitigating and/or complicating factors. For example, where it is known that a moon rises near sunset, so as to provide some period of additional adequate visibility, a return alert may be delayed automatically. Alternatively, the user presented with information regarding additional navigation visibility due to the moon so that the user may direct the return alert to be calculated based on the additional period of adequate visibility, or it may be calculated automatically. As will be apparent, the phases of the moon relative to a particular location can be a computational factor in tide-related nature events and/or used in calculating tide tables retrievable from a memory or remote database. Factors adversely impacting return time may be handled similarly.

Figure 3:
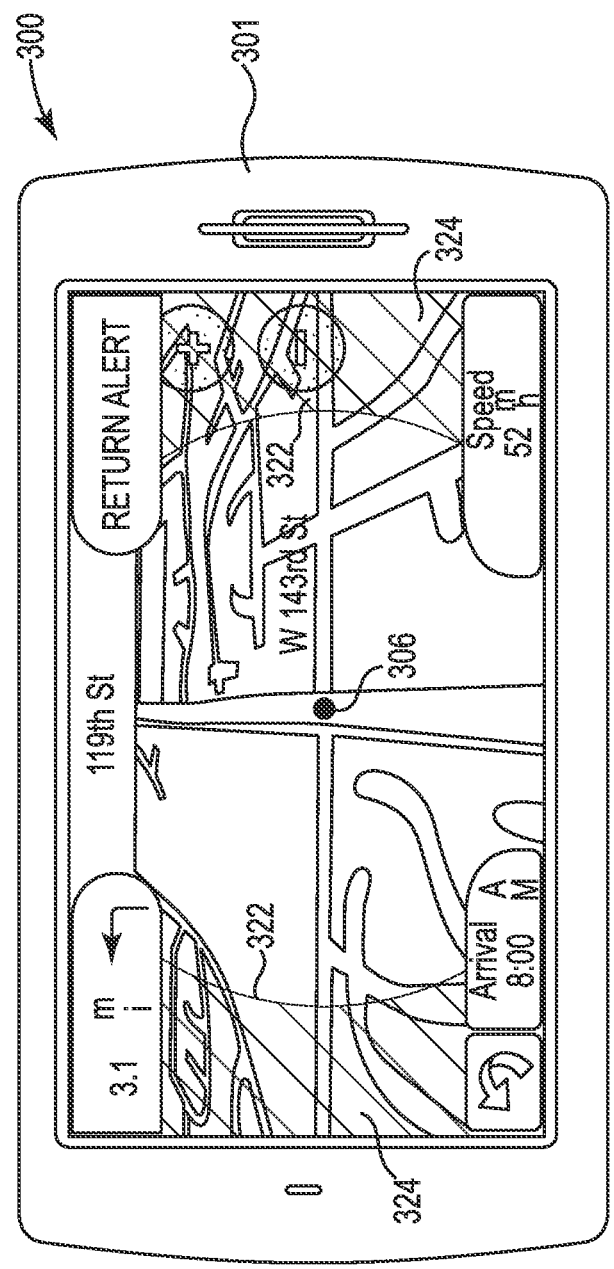
FIG. 3 illustrates a display screen having an attribute of navigation information that may be altered to furnish notification of a return alert according to various embodiments of the present disclosure.

FIG. 3 illustrates a display screen having an attribute of navigation information that may be altered to furnish notification of a return alert according to various embodiments of the present disclosure. FIG. 3 shows a mobile electronic device 300 having a housing 301 that frames a display 324 providing a user a graphical indication of the current location 306 with respect to a displayed map, and one or more return alert indications resulting from one or more return alert techniques discussed above.

FIG. 3 also shows a range indication 322, which may indicate a distance from the current location 306 that can be reached at a speed (e.g., return speed, average speed for the trip, etc.) before the occurrence of a nature event (e.g., sunset). The range indication shown in FIG. 3 may indicate the distance that may be reached before sunset for a given travel speed. The travel speed may be a return speed, for example, obtained as previously discussed.

As further indication that the range indication pertains to a nature event such as sunset, shading 324 can be used to designate areas on the display further than the range indication to convey that it will be dark by the time the user can travel to these more-distant locations at the travel speed. Shading can include a change in color, grayscale, or other display attribute. Where the nature event is sunrise, the orientation of shaded and unshaded portions of the display shown in FIG. 3 can be reversed to indicate a range of travel that can be achieved before light, which may be useful to hunters and/or military users.

In an embodiment, the return alert can include more or different information in the display of the return alert graphical icon. For example, the return alert may include information regarding the location of the reference location including direction, distance, estimated return travel time, identification of the nature event, nature event time, minimum speed, suggested speed, route, weather, or other related information.

A return alert can be signaled in a variety of ways, for example, by display of a "RETURN ALERT" graphical icon, as shown located in the upper-right corner of the display 324 in FIG. 3. However, embodiments of the present disclosure are not limited to a particular location and/or form of a graphical return alert indication. For example, a return alert graphical icon may be located in any corner of the display, or temporarily be displayed in the center of the display, or take up the entire display and may be of any shape, color, and/or format. In an embodiment, the return alert graphical icon may simply display "RETURN ALERT," as shown in FIG. 3, to prompt the user to seek information regarding the details of the return alert via I/O interactions with the mobile electronic device 300.

As discussed above, the boundary between daylight and darkness is not abrupt, but occurs as a more gradual transition. As such, rather than indicating a distinct range indication by a line at a given radius from the current location 306, the occurrence of the nature event can be shown for the range from the current location 306 by a graduated shading that increases in darkness for greater distances away from the current location 306. In this manner, a user can see the locations they might reach at corresponding levels of daylight right on the display.

Although the range indication shown on the display in FIG. 3 is illustrated as portions of a circle at a fixed distance from the current location, embodiments of the present disclosure are not limited to circular range indications. A range indication corresponding to a time of occurrence of a nature event may be delineated by any appropriate markings. The range indication may extend further in a direction where the elevation decreases, and is shown closer to the current location in directions where the elevation increases. The range indication for a driving application may extend further along highways than city streets, based, for example, on differing speed limits and/or reported traffic along various routes. Other features and attributes of the mobile electronic device 300 for signaling a return alert, which may be applied to the display of a range indication corresponding to a nature event, are described below with respect to FIG. 4.

Figure 4:
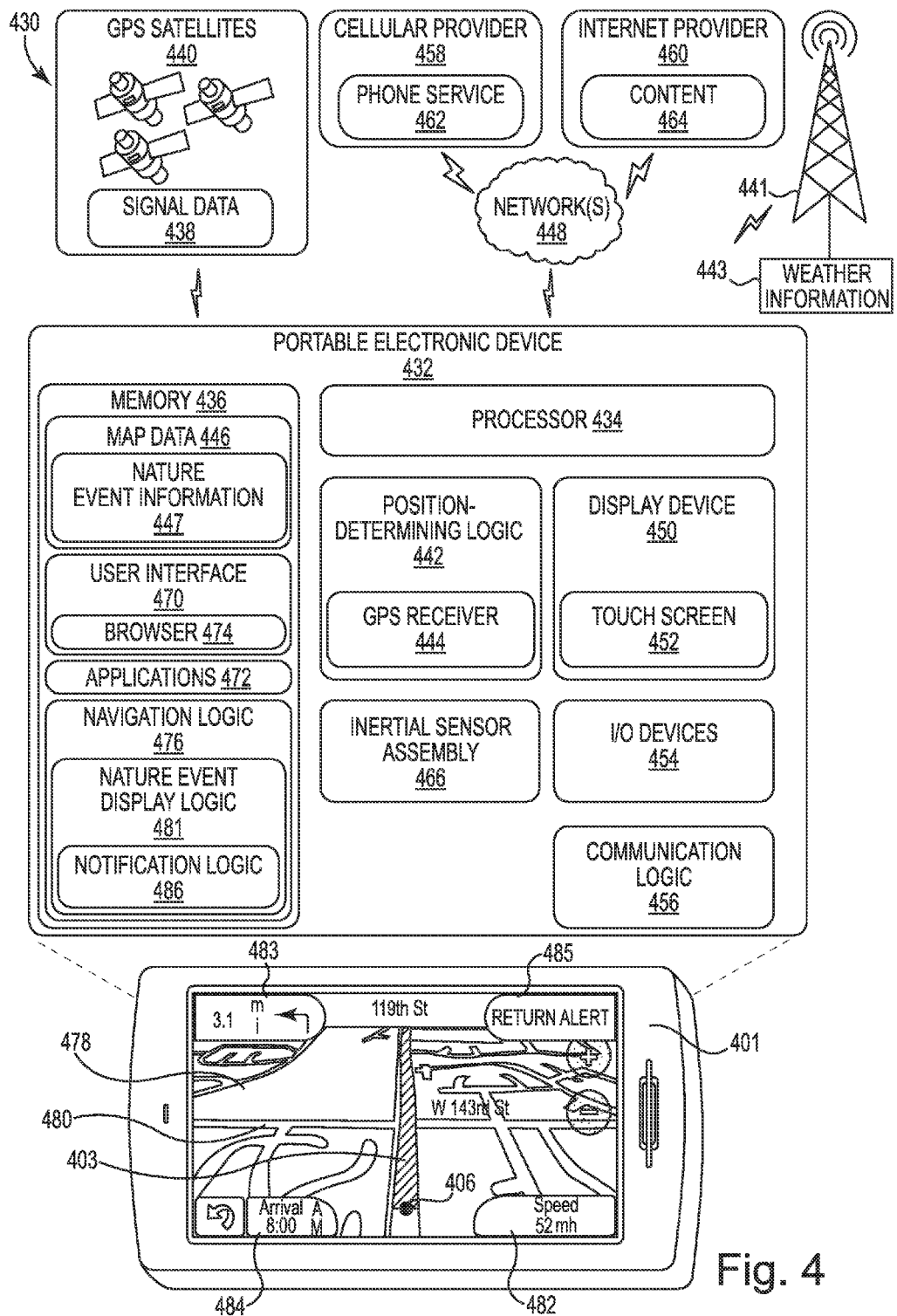
FIG. 4 is a block diagram of electronic components of a mobile electronic device having nature event signaling according to various embodiments of the present disclosure.

FIG. 4 is a block diagram of electronic components of a mobile electronic device having nature event signaling according to various embodiments of the present disclosure. FIG. 4 illustrates an example mobile electronic device environment 430 that is operable to provide navigation functionality to the user of the mobile electronic device 432. The mobile electronic device 432 is illustrated as including a processor 434 and a memory 436. The processor 434 provides processing functionality for the mobile electronic device 432 and may include any number of processors. The memory 436 can be removable, non-removable, volatile, non-volatile and/or non-transitory for storing data, computer readable instructions executable by the processor, map data, weather data, speed data, and other information received, accessed or generated by the mobile electronic device 432 to perform the techniques of nature event signaling. The processor 434 may execute one or more software programs which implement the techniques and logic described herein.

The mobile electronic device 432 includes functionality to determine position. The mobile electronic device 432 may receive signal data 438 transmitted by one or more position data platforms and/or position data transmitters, depicted as Global Positioning System (GPS) satellites 440. The mobile electronic device 432 may include a position-determining logic 442 that processes signal data 438 received from GPS satellites 440 via a GPS receiver 444. The position-determining logic 442 is operable to determine a geographic position through processing of the received signal data 438. The signal data 438 may include various data suitable for use in position determination, such as timing signals, ranging signals, ephemerides, almanacs, triangulation signals, and so forth. The position-determining logic 442 may be, for example, a GPS receiver much like those provided in products by Garmin®.

Position-determining logic 442 may also be configured to provide a variety of other position-determining functionality, such as to provide position/location information, timing information, and/or speed information. The position-determining logic 442, for instance, may use signal data 438 received via the GPS receiver 444 in combination with map data 446 that is stored in the memory 436 to generate navigation instructions (e.g., turn-by-turn instructions to an input destination, waypoint, or Point Of Interest (POI)), show a current position on a map, and so on. Position-determining logic 442 may include one or more antennas (e.g., GPS antenna) to receive signal data 438. Although a GPS system is described and illustrated in relation to FIG. 4, it should be understood that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. The positioning-determining functionality may be implemented through the use of a server in a server-based architecture, from a ground-based infrastructure, through one or more sensors (e.g., gyros, odometers, and magnetometers), and so on.

The mobile electronic device 432 includes a display. The display 450 may be provided with a touch screen 452. The mobile electronic device 432 may further include one or more input/output (I/O) devices 454 such as a keypad, buttons, a wireless input device, and one or more vibration signaling devices such that a return alert indication can be provided visually, audibly, and/or tacitly. For instance, in some embodiments, one or more audible tones may be used to communicate a return alert to a user.

The mobile electronic device 432 may also include communication logic 456 to permit mobile electronic device 432 to send/receive over the one or more networks 448. Communication logic 456 may be representative of a variety of communication components and functionality including, but not limited to one or more radio frequency (RF) antennas, a browser, a transmitter, a receiver, a wireless radio, data ports, software interfaces and drivers, networking interfaces, and/or data processing components, among others. The communication logic 456 can be operable to upload and download Jeppesen data, device software, and/or other cartographic data, among other information.

The one or more networks 448 are representative of a variety of different communication and/or network connections which may be employed to communicate among the components of the environment 430, including the Internet, a satellite network, a cellular network, a radio network, a mobile data network, and so forth. The communication logic 456 may be configured to communicate map data, landmark data, web pages, weather information, etc.

The mobile electronic device 432 may further include an orientation sensor 466, such as an inertial sensor assembly to determine various manual manipulation of the mobile electronic device 432 including detecting orientation, motion, speed, acceleration, impact, among others. The orientation sensor 466 may be an accelerometer, gyroscope, velocimeter, altimeter, and so on.

The mobile electronic device 432 can also include a user interface 470 configured to control the display 450, and/or to provide functionality to allow the user to interact with one or more applications 472 of the mobile electronic device 432. User interface 470 may allow a user to input and/or select a reference location and adjust return alert settings. For instance, a user may manipulate the user interface 470 to turn the return alert on or off, input information (e.g., time of occurrence of the nature event), or otherwise adjust the portable electronic device 432. Applications 472 may comprise software storable in memory 436 and executable by the processor 434, to perform a specific operation.

The mobile electronic device 432 is illustrated in FIG. 4 as including a navigation logic 476, which is storable in memory 436 and executable by the processor 434. The navigation logic 476 represents functionality to access map data 446 that may be stored in the memory 436 to provide mapping and navigation functionality. The navigation logic 476 may generate navigation information 478 that includes maps, landmark information, and/or other map-related content for presentation by display device 450, including nature event information, POIs, waypoints, information associated with POIs and waypoints, map legends, controls for manipulation of a map (e.g., scroll, pan, etc.), street views, aerial/satellite views, alert (e.g., return alert) signaling.

In one or more implementations, the navigation logic 476 is configured to utilize the map data 446 to generate navigation information 478 that includes providing mapping and navigation functionality when access to external content 464 is not available through network(s) 448. It is to be understood, however, that the navigation logic 476 may also be capable of accessing a variety of content 464 via the network(s) 448 to generate navigation information 478.

The navigation logic 476 may be configured as an application 472 accessed by the user interface 470. The navigation logic 476 may utilize position data determined by the position-determining logic 442 to show a current position of the mobile electronic device 432 on a displayed map, furnish navigation instructions (e.g., turn-by-turn instructions to an input destination, waypoint, reference position, or POI), calculate route distances and times, as well as other navigation-related and/or other information. The navigation logic 476 may cause the display device 450 of the mobile electronic device 432 to be configured to display navigation information 478 that includes a map 480, which may be a moving map, that includes a route (e.g., roadway, airway, waterway, etc.) graphic 403. The roadway represented by the roadway graphic 403 can comprise, without limitation, any navigable route, trail, road, street, pike, highway, toll way, freeway, interstate highway, airway, waterway, among others.

The mobile electronic device 432 is also illustrated as including a nature event display logic 481, which is storable in memory 436 and executable by the processor 434 to calculate the time at which one or more nature events may occur at a particular location. The nature event display logic 481 may also include functionality to and cause return alerts related to certain nature events to be signaled to a notification logic 486 that may cause a graphic return alert indication 485 to be provided as navigation information 478.

The graphic return alert indication 485 may be displayed in a variety of ways including as by a return alert icon located in a fixed location over the map 480, and/or annotating the navigable route 480 and/or area depicted by the map 480. The return alert indicator graphic 485 may further be displayed within a dashboard display like that shown for speed 482, distance 483, and time 484.

The nature event display logic 481 may acquire information related to the occurrence of nature events from a variety of sources. Nature event information 447 may be retrieved from map data 446 stored in memory 436 or be acquired from content 464 accessed via the network(s) 448 from look-up tables provided to the public by government and/or military authorities (e.g., sunrise, sunset, and/or tide level databases). The nature event information 447 can be geo-referenced to be cross-referenced with geo-spatial coordinate information such as latitude, longitude, date, altitude, and so on. A local time of occurrence of an event of nature can be determined at particular location on a particular date. The nature event display logic 481 may ascertain nature event information at a reference position of interest to the user by comparing the geo-referenced nature event information 447 with the geographic reference position, as may be determined by the position-determining logic 442, such as by map-matching.

The nature event display logic 481 is illustrated as including a notification logic 486, which is also storable in memory 436 and executable by the processor 434. The notification logic 486 provides functionality to furnish notification of a return alert indication. The notification logic 486 can receive an indication based on a change in time, location, speed, return distance, terrain, weather information, and/or other factors that warrant or impact initiation of a return journey, and in response, cause an attribute of the displayed navigation information 478 to be temporarily or continuously altered. The return alert can be made to the user by visual signal, audible signal (e.g., beeps, speech), and/or physical signal (e.g., vibration). A return alert indication can affect any aspect, feature, or characteristic of the navigation information 478 including, but not limited to, the hue, color, grey scale, shading, brightness of map 480 and/or the return alert indicator graphic 485, and/or dashboard display (e.g., 482, 483, 484), icon displayed over the map 480, and/or displayed text, and so on. Audible return alert warnings may also be furnished to the user in addition to, or in place of, a one or more visual notifications provided by an altered map attribute.

A return travel time can optionally include some additional time, beyond calculated return travel time, to provide a margin of safety to ensure a user will arrive to the reference location before the nature event occurs. A return alert can be provided to the user with several speed options corresponding with departure times (e.g., return now at 4 MPH or return beginning in 15 minutes at 5 MPH).

In some instances, timing of an occurrence for an event of nature may be changed because of a variable condition. For example, overcast skies may cause darkness ahead of the sunset time. The communication logic 456 may be configured to receive weather information that may have an impact a natural event observance or effect, or affect return speed. Such modifying information may be cross-referenced with geo-spatial coordinate information (e.g., latitude, longitude, altitude, and so on), and incorporated into return alert computations The mobile electronic device 432 can include an altimeter to provide altitude information and used in calculating a position, an elevation, weather factors, and the like, which can affect, for example, a location of a horizon. The mobile electronic device 432 can include a power supply, such as a rechargeable or non-rechargeable battery. The housing 401 is configured to enclose and contain other components of the mobile electronic device 432.

Embodiments of the present disclosure are not limited to requiring each of the electronic components of the mobile electronic device having nature event signaling illustrated in FIG. 4. Various embodiments of the present disclosure may one or more of the electronic components of the mobile electronic device illustrated in FIG. 4. For example, various embodiments of the present disclosure may not provide navigation information. Some embodiments may only include a GPS receiver, and an indicator to signal a return alert (e.g., an LED that blinks to alert). A user input, such as a push button, may be provided to mark a reference location and/or acknowledge a return alert.

Figure 5:
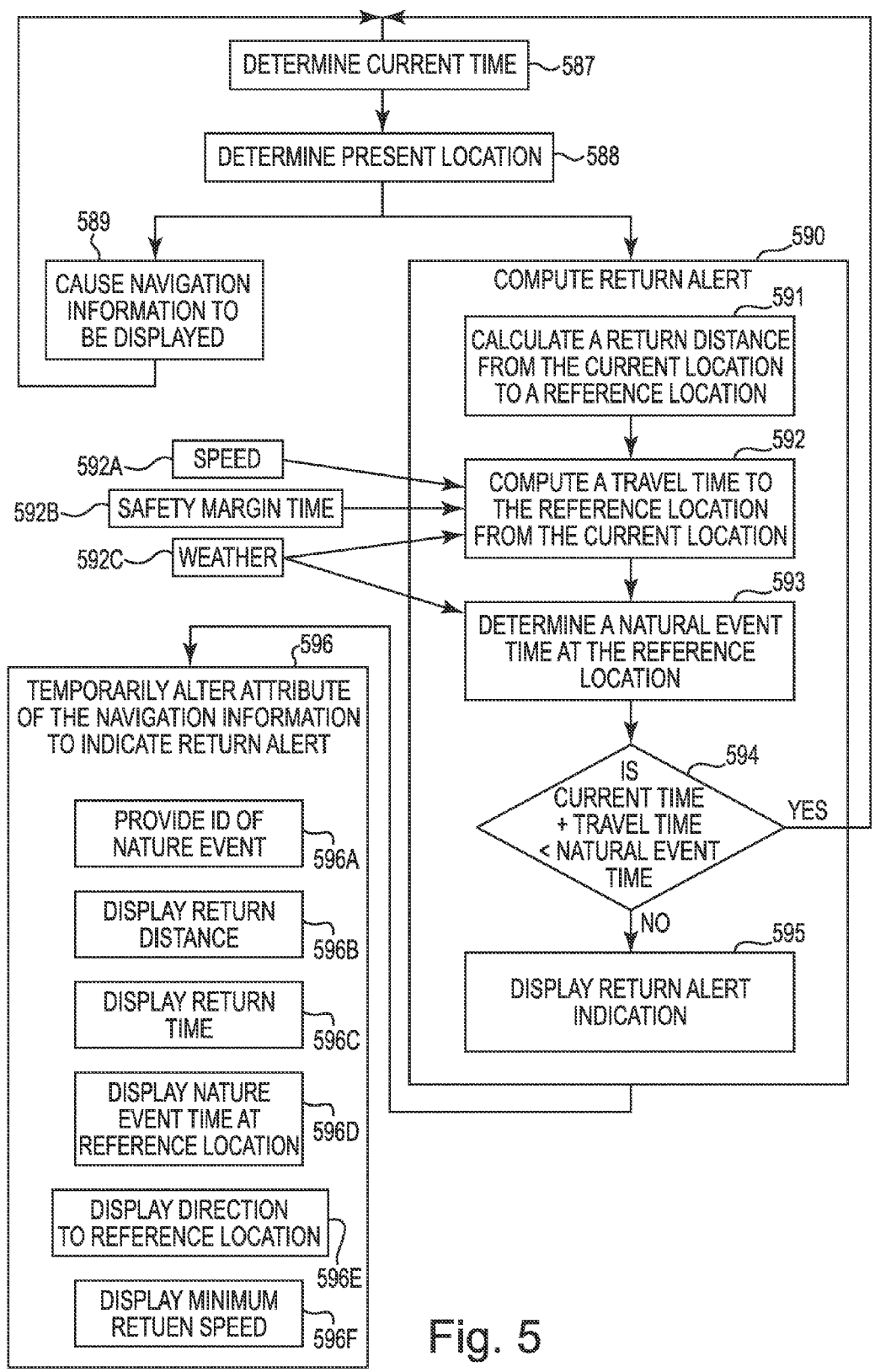
FIG. 5 is a flow chart illustrating an example of a method for nature event signaling according to various embodiments of the present disclosure.

FIG. 5 is a flow chart illustrating an example of a method for nature event signaling according to various embodiments of the present disclosure. As shown at 587, the method can include determining the current time, and determining a current location, as shown at 588. In a foreground computation, navigation information is caused to be displayed, such as on a map, as indicated at 589.

In a background computation, a return alert may be calculated, shown at 590. A distance from the current location to a reference location is calculated at 591, and a travel time to the reference location from the current location is calculated at 592. The travel time computation can reflect speed information 592A, a safety margin time 592B, and/or weather information 592C.

As shown at 593, a nature event time is determined at the reference location. Weather information 592C can also be used in determining the nature event time. At decision 594, if the current time plus the calculated travel time is less than the time of occurrence of the nature event, then the process loops back to determining the current time 587 and current location 588, otherwise a return alert indicator is updated to display a return alert at 595. Thereafter, an attribute of the navigation information is temporarily altered to furnish notification of the return alert, as shown at 596, which may include one or more of providing an identification of the nature event 596A, display of the return distance 596B, a return time 596C, the nature event time at the reference location 596D, the direction to the reference location 596E, and/or a minimum return speed 596F.

The above specification, examples and data provide a description of the method and apparatus of the present disclosure. Since many examples can be made without departing from the spirit and scope of the system and method of the present disclosure, this specification merely sets forth some of the many possible embodiment configurations and implementations. Although specific examples have been illustrated and described herein, those of ordinary skill in the art will appreciate that an arrangement calculated to achieve the same results can be substituted for the specific examples shown. It is to be understood that the above description has been made in an illustrative fashion, and not a restrictive one. Therefore, the scope of one or more examples of the present disclosure should be determined with reference to the appended claims, along with the full range of equivalents to which such claims are entitled.

In the foregoing discussion of the present disclosure, reference is made to the accompanying drawings that form a part hereof, and in which is shown by way of illustration how examples of the disclosure may be practiced. The figures attempt to follow a numbering convention in which the first digit or digits correspond to the drawing figure number and the remaining digits identify an element or component in the drawing. Similar elements or components between different figures may be identified by the use of similar digits. Elements shown in the various figures herein can be added, exchanged, and/or eliminated so as to provide a number of additional examples of the present disclosure. In addition, the proportion and the relative scale of the elements provided in the figures should not be taken in a limiting sense.

What is claimed:

1. A mobile electronic device, comprising:
   a non-transitory computer-readable medium having computer-readable instructions stored thereon; and
   a processor coupled to the non-transitory computer-readable medium, wherein the processor executes the instructions to:
   calculate a distance between a reference location and a current location of the mobile electronic device;
   calculate a travel time for the distance based on a speed;
   determine a nature event time; and
   cause a return alert indication to be signaled based on a comparison of the calculated travel time and the nature event time,
   wherein the processor executes the instructions to calculate the distance between the reference location and the current location as a return distance between the current location and a starting location of a route traveled from the starting location to the current location, wherein the speed is an average speed en route from the starting location to the current location adjusted for changes in terrain for a return route relative to an outbound route.

2. The mobile electronic device of claim 1, wherein the processor executes the instructions to determine the nature event time as one of a sunset time or a sunrise time.

3. The mobile electronic device of claim 1, wherein the processor executes the instructions to calculate an arrival time at the reference location as a sum of a current time reference location and the travel time, wherein the return alert indication is based on a comparison of the calculated arrival time, travel time, and nature time event.

4. The mobile electronic device of claim 1, wherein the processor executes the instructions to determine the nature event time via access of a remote database having nature event times including sunrise and sunset tables, tide tables, and moon phase tables.

5. The mobile electronic device of claim 1, wherein the processor executes the instructions to display a range indication in multiple directions from the current location indicating a plurality of locations that are calculated to be reachable traveling by the nature event time based on a respective speed corresponding with travel on a respective route to each of the plurality of locations.

6. The mobile electronic device of claim 1, wherein the processor executes the instructions to receive an input to adjust a return alert signal to a time different by a certain margin from the nature event time, wherein causing the return alert indication to be signaled is also based on the return alert signal.

7. The mobile electronic device of claim 1, wherein the processor executes the instructions to cause the return alert indication to be signaled, the return alert indication including an indication the nature event time and an identification of a nature event corresponding to the nature event time.

8. A mobile electronic device, comprising:
   a non-transitory computer-readable medium having computer-readable instructions stored thereon; and
   a processor coupled to the non-transitory computer-readable medium, wherein the processor executes the instructions to:
   calculate a distance between a reference location and a current location of the mobile electronic device;
   calculate a travel time for the distance based on a speed;
   determine a nature event time; and
   cause a return alert indication to be signaled based on a comparison of the calculated travel time and the nature event time,
   wherein the processor executes the instructions to cause the return alert indication to be signaled that includes display of a minimum speed necessary for traversing the distance to reach the reference location before the nature event time.

9. A mobile electronic device, comprising:
   a memory operable to store executable instructions, map data, and at least one geo-referenced nature event time;
   location-determining functionality coupled to the memory and operable to receive signals to determine a reference location and a current location of the mobile electronic device based on the signals;
   a display device to display navigation information generated using the map data, wherein the navigation information includes a distance to the reference location; and
   a processor coupled to the memory, wherein the processor executes the instructions to:
   calculate a travel time for the distance to the reference location based on a speed;

determine a nature event time at the reference location;
calculate a departure time associated with the reference location as a difference between the nature event time and the travel time to the reference location; and
cause the display device to signal the graphic return alert indication based on a comparison of a current time and the calculated departure time,
wherein the processor executes the instructions to cause the return alert indication to be signaled that includes display of a minimum speed necessary for traversing the distance to reach the reference location before the nature event time.

10. The mobile electronic device of claim 9, wherein the processor executes the instructions to a travel time is calculated for a plurality of reference locations, a nature event time is determined for the plurality of reference locations, a departure time is calculated for the plurality of reference locations, and the display device is caused to signal the graphic return alert indication based on a comparison of a current time and a calculated departure time for each of the respective reference locations according to a hierarchy adjustable by a user input.

11. A method, comprising:
calculating, by a mobile electronic device, a distance between a reference location and a current location;
calculating a travel time for the distance based on a speed;
determining a nature event time; and
causing a return alert indication to be signaled, via the mobile electronic device, based on a comparison of the calculated travel time and the nature event time,
wherein signaling the return alert indication includes displaying a range indication in multiple directions from the current location indicating a plurality of locations that are calculated to be reachable traveling by the nature event time based on a respective speed corresponding with travel on a respective route to each of the plurality of locations.

12. The method of claim 11, wherein determining a nature event time includes determining for the reference location one of a sunset time or a sunrise time.

13. The method of claim 11, further comprising calculating an arrival time at the reference location as a sum of a current time at the reference location and the travel time, wherein the return alert indication is based on a comparison of the calculated arrival time at the reference location, travel time, and the nature event time.

14. The method of claim 11, wherein determining a nature event time includes accessing a remote database having nature event times including sunrise and sunset tables, tide tables, and moon phase tables.

15. The method of claim 11, wherein causing the return alert indication to be signaled includes causing display of a minimum speed necessary for traversing the distance to reach the reference location before the nature event time.

16. The method of claim 11, further comprising receiving an input to adjust a return alert signal to a time different by a certain margin from the nature event time, wherein causing a return alert indication to be signaled is also based on the return alert signal.

17. The method of claim 11, wherein causing the return alert indication to be signaled includes indicating the nature event time at the reference location and an identification of a nature event corresponding to the nature event time.

18. A method, comprising:
calculating, by a mobile electronic device, a distance between a reference location and a current location;
calculating a travel time for the distance based on a speed;
determining a nature event time; and
causing a return alert indication to be signaled, via the mobile electronic device, based on a comparison of the calculated travel time and the nature event time,
wherein calculating the distance between the reference location and the current location includes calculating a return distance between the current location and a starting location of a route traveled from the starting location to the current location, and wherein the speed is an average speed en route from the starting location to the current location adjusted for changes in terrain for a return route relative to an outbound route.

* * * * *